US012669220B2

(12) United States Patent
Muller et al.

(10) Patent No.: US 12,669,220 B2

(45) Date of Patent: Jun. 30, 2026

(54) PRESSURE REDUCING DEVICE

(71) Applicant: L'Air Liquide, Société Anonyme pour l'Etude et l'Exploitation des Procédés Georges Claude, Paris (FR)

(72) Inventors: Denis Muller, Rueil Malmaison (FR); Robert Kremer, Krefeld (DE); Daniel Ibald, Handewitt (DE)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 96 days.

(21) Appl. No.: 18/570,196

(22) PCT Filed: Jun. 8, 2022

(86) PCT No.: PCT/EP2022/065496

§ 371 (c)(1),
(2) Date: Dec. 14, 2023

(87) PCT Pub. No.: WO2022/263247

PCT Pub. Date: Dec. 22, 2022

(65) Prior Publication Data

US 2024/0288127 A1 Aug. 29, 2024

(30) Foreign Application Priority Data

Jun. 15, 2021 (EP) .................................... 21179536

(51) Int. Cl.
*F17C 13/04* (2006.01)

(52) U.S. Cl.
CPC ...... *F17C 13/04* (2013.01); *F17C 2201/0119* (2013.01); *F17C 2205/0314* (2013.01);
(Continued)

(58) Field of Classification Search
CPC ........................... F17C 13/04; Y10T 137/7728
See application file for complete search history.

(56) References Cited

U.S. PATENT DOCUMENTS 4,188,971 A 2/1980 Otteson
4,471,812 A * 9/1984 Bertsch ............... F16K 17/0453 137/527.6

(Continued)

FOREIGN PATENT DOCUMENTS

| | | |
|---|---|---|
| EP | 0 532 402 | 10/1996 |
| EP | 3 495 713 | 6/2019 |
| GB | 2 287 330 | 9/1995 |

OTHER PUBLICATIONS

International Search Report and Written Opinion for corresponding PCT/EP2022/065496, Aug. 26, 2022.

*Primary Examiner* — Reinaldo Sanchez-Medina
*Assistant Examiner* — Nicole Gardner
(74) *Attorney, Agent, or Firm* — Elwood L. Haynes

(57) ABSTRACT

A pressure reducing device having an upstream end connected to a pressurized gas source and a downstream end connected to a coupled installation. The device includes an operational fluid circuit having a pressure reducing unit configured to reduce the pressure of a pressurized gas flow to a maximum pressure $P_A$, an emergency shut-off valve and an outlet interface with a pressure capability $P_N$. The safety relief device is configured to have at least two states. A closed state where the safety relief device is inactive and the emergency shutoff valve is open, when the pressure in the fluid circuit downstream of the pressure reducing unit is lower than a predetermined pressure $P_L$. And an open state where the safety relief device is active and the emergency shutoff valve is closed, when the pressure in the fluid circuit downstream of the pressure reducing unit is higher to the predetermined pressure $P_L$.

13 Claims, 5 Drawing Sheets

(52) U.S. Cl.
CPC ................. *F17C 2205/0332* (2013.01); *F17C 2205/0335* (2013.01); *F17C 2205/0338* (2013.01); *F17C 2205/0341* (2013.01); *F17C 2205/0385* (2013.01); *F17C 2205/0394* (2013.01); *F17C 2221/012* (2013.01); *F17C 2223/0123* (2013.01); *F17C 2223/036* (2013.01); *F17C 2260/021* (2013.01)

(56) References Cited

U.S. PATENT DOCUMENTS

| | | | | |
|---|---|---|---|---|
| 4,674,289 | A * | 6/1987 | Andonian | F17C 9/00<br>62/47.1 |
| 4,869,301 | A * | 9/1989 | Ohmi | H01L 21/67069<br>141/85 |
| 5,127,436 | A * | 7/1992 | Campion | F17C 13/04<br>137/614.19 |
| 5,240,034 | A | 8/1993 | Cornil | |
| 5,309,945 | A * | 5/1994 | Sakai | F17C 13/04<br>137/861 |
| 5,727,589 | A * | 3/1998 | Yokogi | F17C 7/00<br>141/85 |
| 5,738,145 | A * | 4/1998 | Daicho | F16K 1/306<br>222/3 |
| 5,752,544 | A | 5/1998 | Yves | |
| 9,328,745 | B2 | 5/2016 | Bartlok et al. | |
| 2002/0124883 | A1 * | 9/2002 | Zheng | F17C 5/02<br>137/240 |
| 2014/0318642 | A1 | 10/2014 | Van Der Klift et al. | |

* cited by examiner

[Fig. 1]
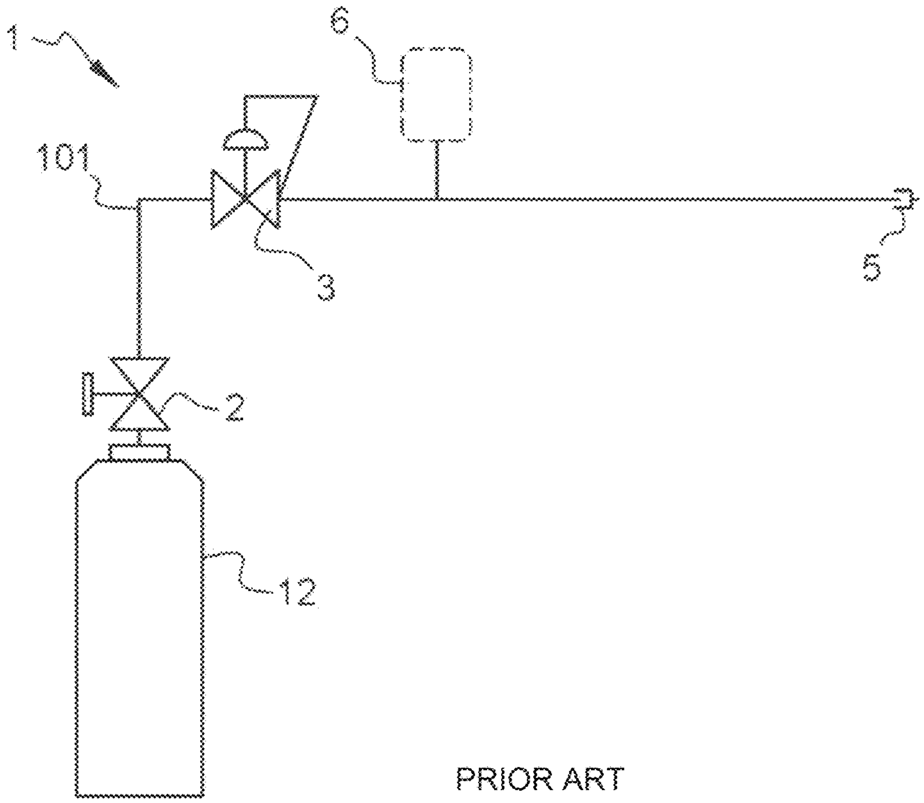
[Fig. 2]
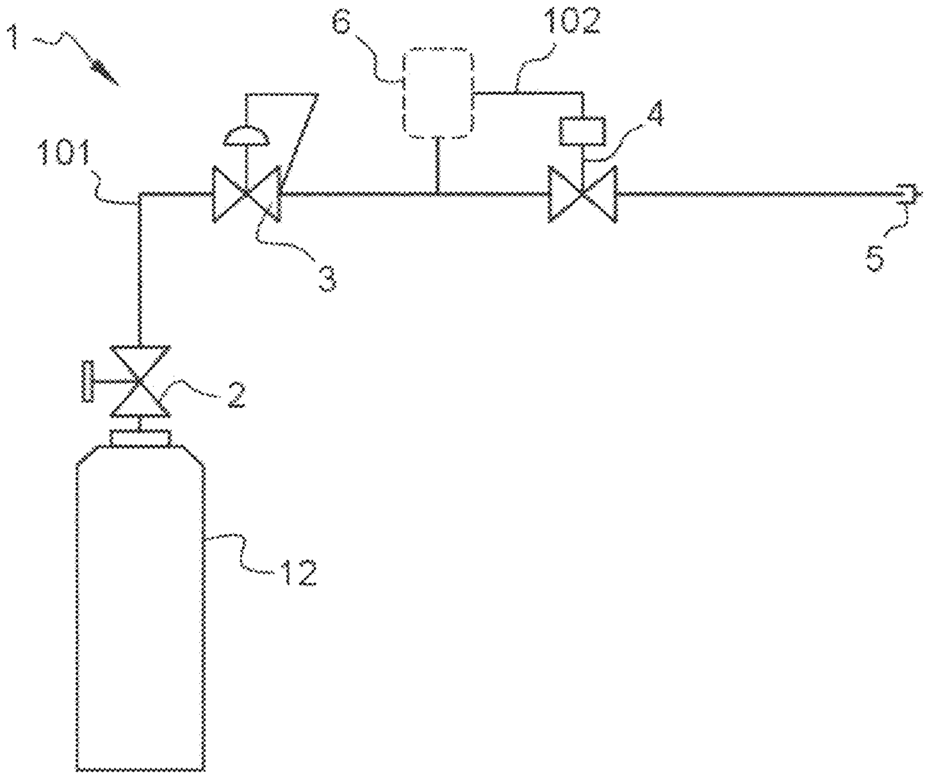

[Fig. 3]
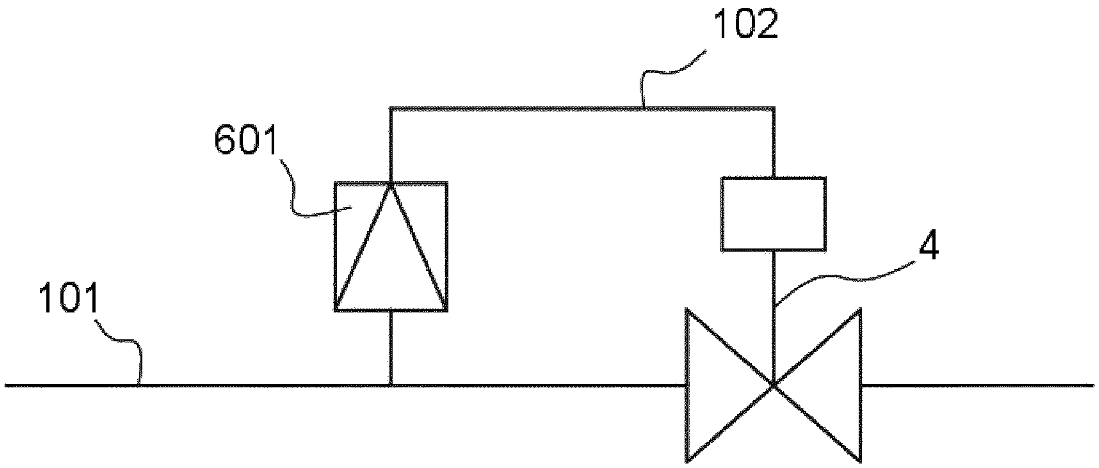
[Fig. 4]
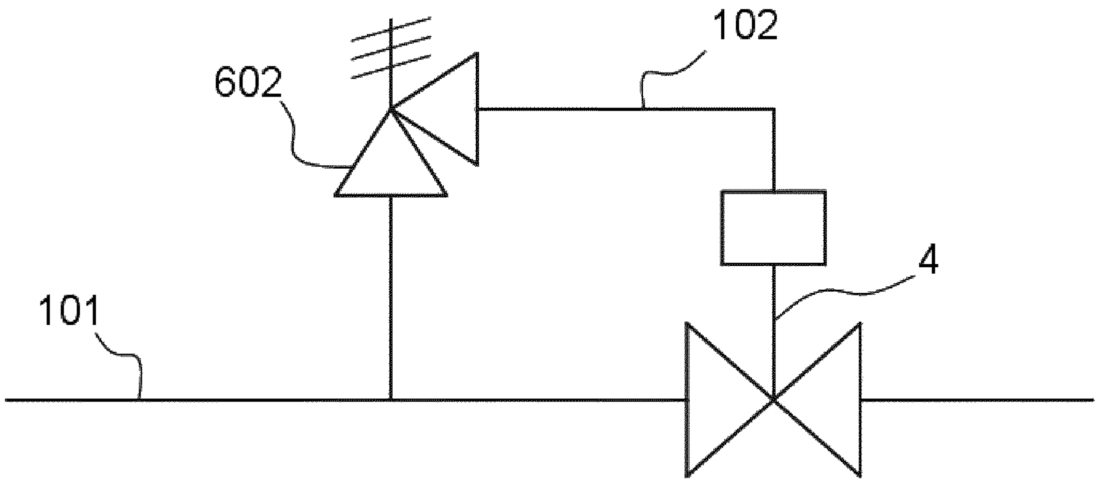

[Fig. 5]
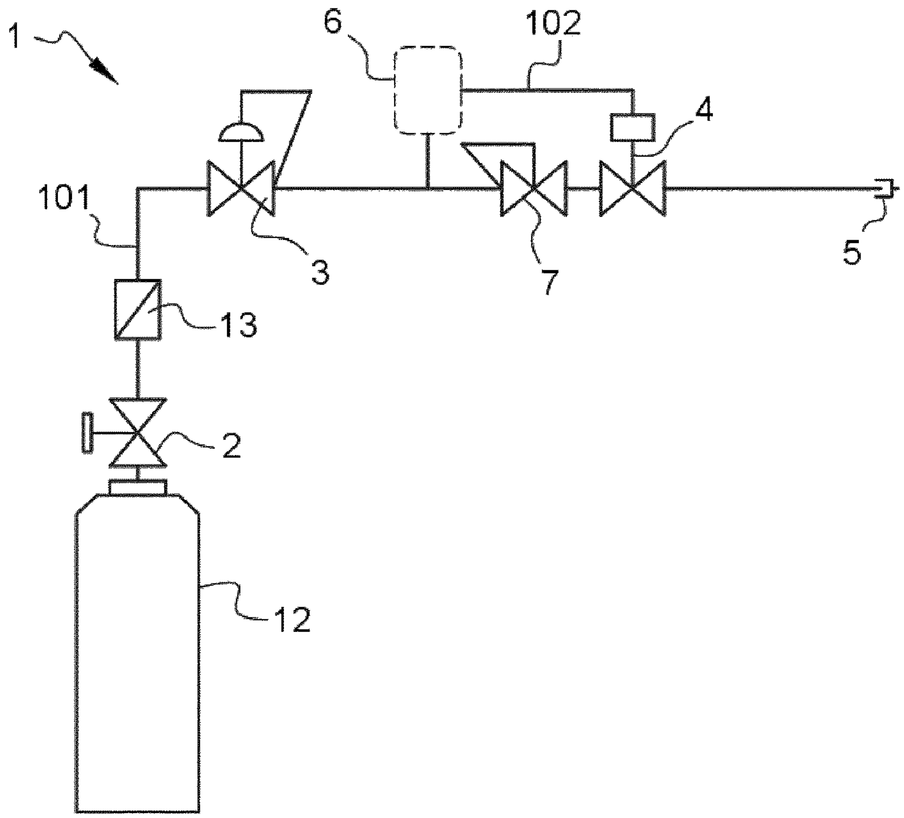
[Fig. 6]
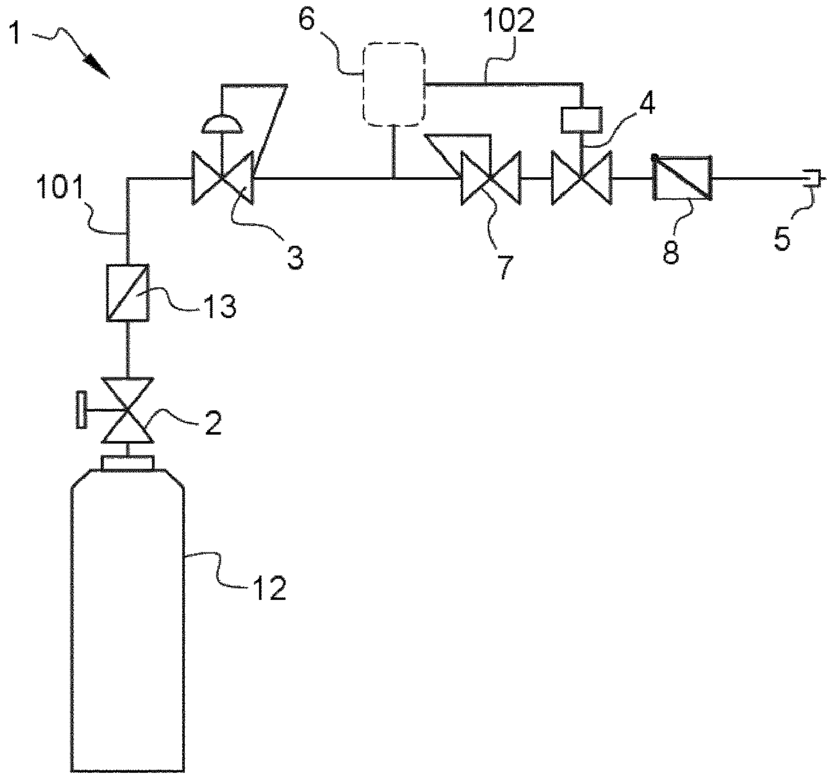

[Fig. 7]
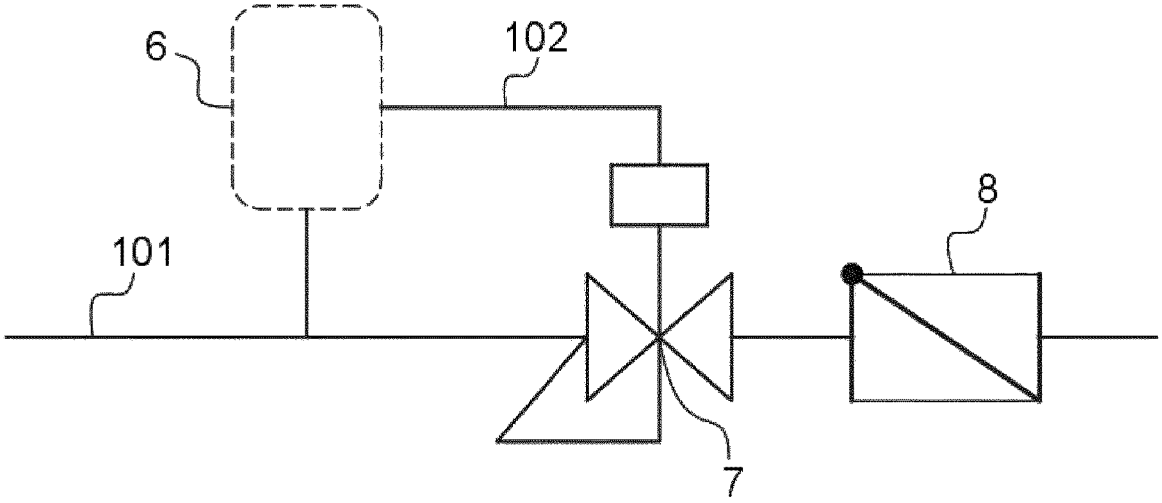
[Fig. 8]
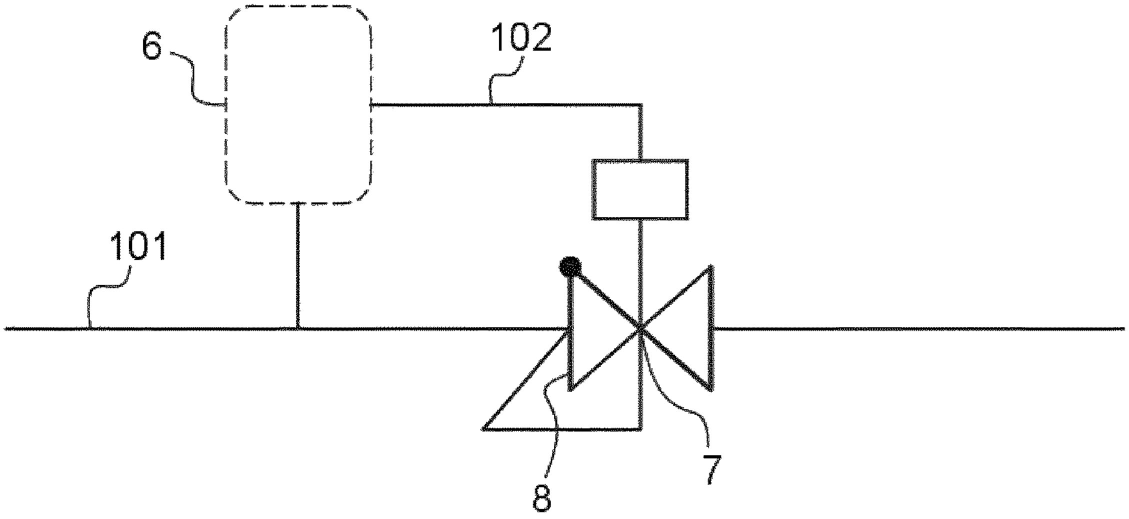

[Fig. 9]
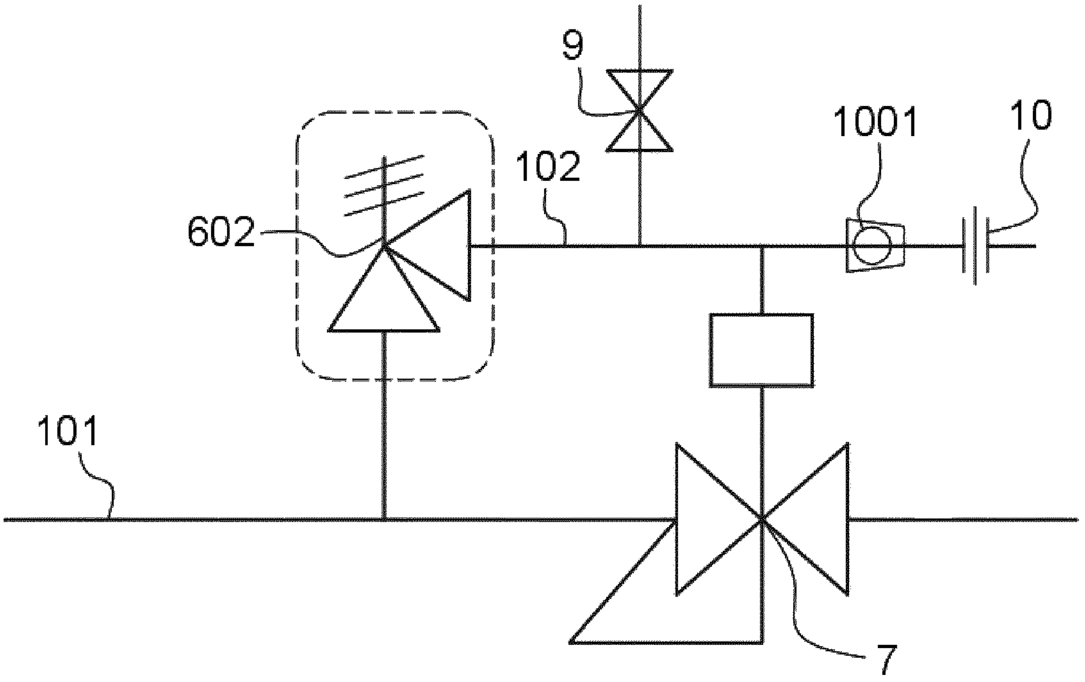
[Fig. 10]
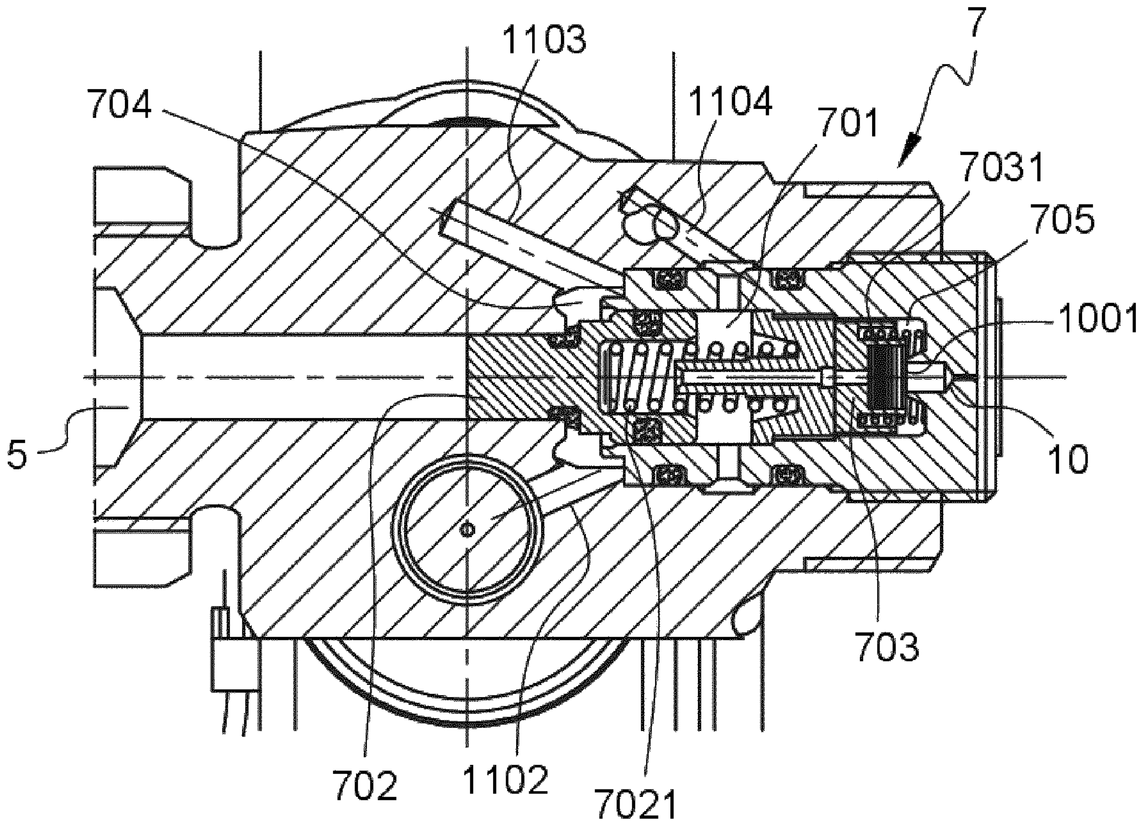

PRESSURE REDUCING DEVICE

CROSS REFERENCE TO RELATED APPLICATIONS

This application is a 371 of International Application No. PCT/EP2-022/065496, filed Jun. 8, 2022, which claims priority to European Patent Application No. 21179536, filed Jun. 15, 2021, the entire contents of which are incorporated herein by reference.

TECHNICAL FIELD

The invention relates to the field of valves for compressed gas.

More specifically, the invention relates to pressure reducing devices.

STATE OF THE ART

Pressure reducing devices dedicated to high pressure fluids have been used for many years already. Pressure reducing devices allow to use high pressure sources, of for example 300 bar and higher, while remaining compatible with coupled installations that require a lower pressure inlet, of for example 200 bar and lower through the use of specifically made interfaces, i.e. valve delivery port specifically coded for such lower pressures as per applicable regulation/standard.

A fluid's pressure and volume are correlated, as when the pressure increases, the volume decreases. Therefore, pressure reducing devices make the user's tasks easier as more gas can be stored in a higher-pressure vessel while keeping its volume small. Using a pressure reducing device will allow the user to have a desired pressure for the coupled installations that are typically designed for lower pressures, even if the stored fluid has a pressure being over the coupled installation's capacity. So, pressure reducing devices increase either usage autonomy at equivalent size of vessel, or increase portability, by reducing the vessel's size and weight.

These pressure reducing devices are, for example, used in standalone cylinders, as well as bundles and trailers. This feature is concretely achieved by implementing an integrated pressure unit within the cylinder valve body (for instance, main shutoff valve, pressure regulating unit, emergency shutoff valve and safety relief device are integrated in same body), or with separate elements (main shutoff valve, pressure regulating unit, emergency shutoff valve and safety relief device are different objects) within a dedicated gas panel on the bundles, tube trailers, . . . . The downstream end of the pressure reducing device may comprise an outlet valve, or it can be just a simple connection or interface.

FIG. 1 represents a typical pressure reducing device as it is known in the art. The pressure reducing device comprises an operational fluid circuit 101 having an optional main shutoff valve 2 allowing the opening-up of the pressure reducing unit, a pressure regulating unit 3 reducing the pressure to a set desired value with a maximum pressure $P_A$ it can deliver, a safety relief device 6 opening itself in case of an excess pressure being higher than the maximum allowable pressure $P_A$ in the coupled downstream installation is present, and an outlet interface 5 that may comprise a valve, being connected to the coupled installation.

The Safety relief device 6 is located downstream of the pressure reducing unit 3 to protect the lower pressure side of the system. The safety relief device 6 can for example be a safety relief valve or a bursting disc, being respectively reversible and single use. The safety relief device 6 is designed to open in case of an unexpected excess pressure being higher than the maximum allowable pressure in the coupled installation is being detected, this excess pressure can for example be due to a failure or malfunction of the pressure reducing unit 3. An outlet interface 5 can be configured in different manners, such as threaded joint, quick-connect, featuring a check-valve, a non-return valve, a shut-off valve. The outlet interface 5 has a determined pressure $P_N$ (e.g. 200 bar) which corresponds either to its pressure capability or rating. The fluid passing through the safety relief device is vented either directly to atmosphere or might be collected.

On FIG. 1, an optional gas filter can be placed between the main shutoff valve 2 and the pressure reducing unit 3, but it is possible to be placed upstream of the main shutoff valve, and an optional non-return valve can be placed in the fluid circuit, downstream the emergency shutoff valve. There can be several filters.

Having the fluid vented away from the system or stored as it is currently done presents some issues and can't be accepted under certain circumstances. For instance, the fluid contained might be a flammable medium such as hydrogen or other fluids creating dangerous and/or toxic environments, e.g. ATEX (Atmosphere Explosives).

Indeed, in case of a flammable medium such as hydrogen, a free venting in the atmosphere might lead to generation of an explosive zone if the area is confined or insufficiently vented; this requires an expansive setup by the user, such as gas detection with automatic shutoff, or alternatively a strong ventilation if the mobile is used indoor.

Although the safety relief device can be collected to a complimentary exhaust pipeline or equivalent, it would complicate the connection process to the installation by requiring additional setups and extra handling steps, for example extensive safety checks, relying on a procedural barrier.

Moreover, safety relief devices are mechanical components and are therefore prone to failure. Although these devices are designed to be highly reliable, malfunctions and defects should always be taken into consideration.

Solutions to the above-mentioned issues do exist, such as implementing an automatic valve, e.g. pneumatic, upstream or downstream of the pressure reducing unit as well as a pressure sensor and/or switch downstream. In the case of implementing external logics such as a PLC (programmable logic controller), any sensed pressure increase would lead to a closing of the automatic valve. This type of technology would require extra external energy, for example compressed dry air (CDA) for valve actuation or electricity to manage a PLC and a solenoid. This solution would not be satisfactory in many situations, and the quality-price ratio is low.

Another solution to the above-mentioned issues would be to make the coupled installation self-protected by installing a compliant safety relief device at the inlet of installation, which would still need connection to a relevant exhaust line. This solution would be implemented at excessive costs.

As it has been discussed, there is a need for a safe, simple, and easy to use pressure reducing device to avoid any endangerment of people and work environment.

To this end, it is proposed a pressure reducing device comprising an upstream end configured to be connected to a pressurized gas source and a downstream end configured to be connected to a coupled installation and comprising:

an operational fluid circuit comprising a pressure reducing unit configured to reduce the pressure of a pressurized gas flow to a maximum pressure $P_A$, an emergency shut-off valve and an outlet interface with a pressure capability $P_N$, a relief fluid circuit comprising a first end connected to the operational fluid circuit downstream of the pressure reducing unit and a safety relief device, characterized in that the relief fluid circuit comprises a second end connected to the emergency shutoff valve, and that the safety relief device has two states, a closed state where the safety relief device is inactive and the emergency shutoff valve is open, when the pressure in the pressure reducing valve is lower than a predetermined pressure $P_L$, and an open state where the safety relief device is active and the emergency shutoff valve is closed, when the pressure in the fluid circuit downstream of the pressure reducing unit is higher to the predetermined pressure $P_L$, the predetermined pressure $P_L$ being between $P_A$+5% and $P_A$+500% and/or between $P_N$+5% and $P_N$+500%. Document US20140318642A1 discloses such a pressure regulator according to preamble of claim 1. Invention is defined according to claim 1.

So, the invention solves the above-mentioned problems by implementing a failure safe feature on the pressure reducing device (PRD) that prevents any release of fluid to the atmosphere while requiring no external energy and no extra components such as a PLC system. In case of failure, the pressure increases in the PRD will lead to a spontaneous shutoff of the feeding flow, fully protecting the downstream coupled installation by shutting down the pressure source.

The emergency shutoff valve will get actuated by the overpressure released through the safety relief device (SRD) in case of failure of the pressure reducing unit (PRU). So, instead of releasing the overpressure fluid to atmosphere, the invention allows to advantageously and safely shut down the gas stream.

A first variant would be that the operational fluid circuit of the pressure reducing device may comprise a residual pressure valve. Having a residual pressure valve (RPV) may help the emergency shutoff valve (ESOV) engage more quickly when the SRD is open by keeping a small amount of pressure stored in the RPV.

A second variant of the invention would be that the residual pressure valve may comprise the emergency shutoff valve. Using the residual pressure valve as the emergency shutoff valve would save space as well as reduce the complexity of the fluid circuits used.

A third variant of the invention would be that the pressure reducing valve may also comprise a non-return valve. A non-return valve (NRV) will allow the fluid to flow through it in only one direction. It also always maintains a positive pressure in the system, while preventing any unwanted material from inadvertently being backed into the previous components of the PRD. The non-return function would allow to balance pressures in case of backflow from downstream as well as keeping the emergency shutoff valve closed by stopping the backflow to come back to the ESOV.

A fourth variant of the invention would be that a non-return valve may be comprised in the emergency shutoff valve. Having a NRV in the ESOV would also save space on the operational fluid circuit.

A first option of the invention would be that the safety relief device comprises a bursting disc. A bursting disc (BD) is a sacrificial part as it has a one-time-use membrane that fails at a predetermined pressure. If the BD is opened, or more precisely burst, a simple replacement can be executed and maintenance on PRD becomes simple.

A second option of the invention would be that the safety relief device comprises a safety relief valve. A safety relief valve (SRV) will reduce costs as well as remove the need to have access to extra parts (compared to the use of a BD). The safety relief valve is reversible, and the system could easily be reset.

A fifth variant of the invention would be that the safety relief device and the emergency shutoff valve may be connected through a fluid connection, said connection comprising a reset valve. A reset valve will allow to release the pressure when the SRD has been opened and that the ESOV is closed. The reset valve allows a quick and easy reset of the PRD by purging the relief fluid circuit downstream of the SRV.

The pressure reducing device may be a one-way valve. Such a PRD is used for fluid delivery only, and is for example a bundle.

The pressure reducing device may also be a two-way valve. In that case, the PRD would allow both delivery and filling through either an external neutralization process for single ported valves or through implementation of a dedicated filling port, for example for standalone cylinders or bundles featuring a single valve.

A sixth variant of the invention would be that the pressure reducing device may comprise a bleeding valve. A bleeding valve allows minute amounts of fluid to be released in case of leak, for example from elastomeric ring seals, to avoid any pressure build up on the ESOV, which could otherwise hinder the ESOV's expected function. The bleeding valve could be comprised in the relief fluid circuit.

A seventh variant of the invention would be that the relief fluid circuit comprises a flap may be leaning against the bleeding valve. When the ESOV is closed, the flap will automatically close as well to avoid any release of fluid to the atmosphere.

In a preferred embodiment of the invention, a central part of the residual pressure valve comprises a first piston being mobile in a middle chamber, and the residual pressure valve has three connections:

An entry connection fluidly connecting the pressure reducing unit outlet to the residual pressure valve, a first connection fluidly connecting the residual pressure valve outlet to the safety relief device and a second connection fluidly connecting the safety relief device to the middle chamber of the residual pressure valve, and in the open position of the safety relief device, the outlet valve is moved in a closed position by the first piston.

In this embodiment, a middle chamber is made in the central part of the RPV for the fluid returning from the SRD to the RPV, in case the SRD is opened. When the SRD is opened, the first piston is pushed towards the outlet valve, being the coupled installation's inlet, to close the system.

The central part of the residual pressure valve may also comprise a second piston, the middle chamber being delimited by the first piston and the second piston, and in the open position of the safety relief device, the bleeding valve is closed by the second piston. The second piston would put the bleeding valve's flap in place or be pushed towards the bleeding valve in order to deny any pressure evacuation from the bleeding valve when the SRD is open.

The invention also related to a device for storing and supplying compressed gas comprising a fluid source and a pressure reducing device comprising any of preceding characteristics.

BRIEF DESCRIPTION OF THE FIGURES

The invention is further elucidated in the appending figures and figure description explaining preferred embodiments of the invention. Note that the figures are not drawn to scale. The figures are intended to describe the principles of the invention.

FIG. 1 is a functional representation of the state of the art.

FIG. 2 is a functional representation of the core of the invention.

FIG. 3 is a zoomed in functional representation of the relief fluid circuit of a first embodiment of the invention, comprising a bursting disc as the safety relief device.

FIG. 4 is a zoomed in functional representation of the relief fluid circuit of a second embodiment of the invention, comprising a safety relief valve as the safety relief device.

FIG. 5 is a functional representation of a third embodiment of the invention, comprising a residual pressure valve.

FIG. 6 is a functional representation of a fourth embodiment of the invention, comprising a residual pressure valve and a non-return valve.

FIG. 7 is a zoomed in functional representation of a fifth embodiment of the invention, comprising a non-return valve, and where the emergency shutoff valve is a residual pressure valve.

FIG. 8 is a zoomed in functional representation of a sixth embodiment of the invention, where the emergency shutoff valve is a residual pressure valve, and where the non-return valve is comprised in the residual pressure valve.

FIG. 9 is a zoomed in functional representation of a seventh embodiment of the invention, where the safety relief device is a safety relief valve, where the residual pressure valve acts as the emergency shutoff valve, the invention comprising a reset valve and a bleeding valve.

FIG. 10 represents a sketch of an eighth embodiment of the invention, in particular its residual pressure valve.

DETAILED DESCRIPTION OF THE PREFERRED EMBODIMENTS

Unless stated otherwise, a same element appearing on different figures presents a single reference.

Furthermore, the terms "first", "second", and the like in the description and in the claims, are used for distinguishing between similar elements and not necessarily for describing a sequential or chronological order.

A fluid flows from a starting point of a fluid circuit to an end point of a circuit, passing through parts of the fluid circuits, e.g., valves. Positions may be referred to as downstream or upstream of a certain part. "Upstream" is used to describe a position on the circuit, in or before the said part with respect to the direction of the fluid flow whereas "downstream" is used to describe a position on the circuit in or after the said part with respect to the direction of the fluid flow.

FIG. 1 has already been described regarding the state of the art.

FIG. 2 represents the core of the invention. A fluid source 12 feeds the pressure reducing device (PRD) 1, this fluid source being for example a vessel. The PRD 1 comprises an operational fluid circuit 101 and a relief fluid circuit 102. The PRD inlet can be opened by a main shutoff valve (MSOV) 2, the MSOV 2 being part of the operational fluid circuit 101. A pressure reducing unit (PRU) 3 is also situated on the operational fluid circuit 101, and is used as a control valve that reduces higher upstream pressure to predetermined lower constant downstream pressure. The PRU 3 can for example be operated by a spring set to allow a certain pressure to flow through it, the spring being preferably a "Belleville spring". The main shutoff valve 2 and the pressure regulating unit 3 can be provided by single valve.

A Safety relief device (SRD) 6 is also connected to the system to detect any overpressure in the PRD 1. Such an overpressure downstream of the PRU 3 can for example be caused by a malfunctioning PRU 3, a failure of the PRU 3 or a setting error. The SRD 6 will open itself when an overpressure is detected (when subjected to an overpressure) and therefore, the fluid would pass through the open SRD 6. The relief fluid circuit 102 prevents any release of fluid outside of the PRD 1 as it is connected to an emergency shutoff valve (ESOV) 4. The ESOV 4 is used and configured to close the system when the SRD 6 is opened, by receiving the overpressure from the relief fluid circuit 102.

An outlet interface 5 may be placed downstream of the PRD 1 and is used to let the fluid go out of the PRD 1 and to go to a coupled installation. A gas filter 13 may also be added to the PRD 1, preferentially upstream of the PRU 3. Such a gas filter may be used to filter out any unwanted particles in the system, such as dirt or rust particles.

All or some of the operational fluid circuit 101, relief fluid circuit 102, main shutoff valve (MSOV) 2, emergency shutoff valve (ESOV) 4 and outlet interface 5 may be integrated into a common body configured to be removably connected to a fluid source 2 (or separate bodies fluidly connected together). In particular, the pressure reducing device components might be integrated in valve block for gas cylinder and/or bundles. For example, a body or block might contain at least one or several among: PRU 3, part of operational fluid circuit 101, emergency shut-off valve 4, interface 5, main shutoff valve 2, safety relief device 6, relief fluid circuit 102, burst disc.

An overpressure is defined as a pressure being higher than the limit allowable pressure $P_L$ of the coupled installation, $P_L$ being between $P_A$+5% and $P_A$+500% and/or between $P_N$+5% and $P_N$+500%, preferably +20%, $P_A$ and $P_N$ are generally comprised between 200 bar and 300 bar, depending on the coupled installation capabilities. That is to say, when the pressure downstream the pressure reducing unit 3 is abnormal (above the pressure capability $P_N$ of the outlet interface 5 and/or exceeds the maximum pressure $P_A$ of the pressure reducing unit 3 to a predetermined value such as +5% to 500% and preferably +20%) the safety relief device 6 is automatically opened, and the emergency shutoff valve 4 closed.

The SRD 6 can, for example, be a bursting disc 601 (BD), a safety relief valve 602 (SRV), balanced bellows, or power actuated, but the SRD 6 is preferentially a BD or a SRV.

A first embodiment is represented on FIG. 3, on which it shows a closer look at the SRD 6. In this first embodiment, the SRD 6 is a bursting disc (BD) 601. The BD 601 is a sacrificial part because it has a one-time-use membrane that fails at a predetermined pressure. If the BD 601 is burst, a simple replacement can be executed and maintenance on the PRD 1 becomes simple. In case of overpressure, the BD 601 bursts, letting the fluid flow in the relief fluid circuit 102 to the ESOV 4, said ESOV 4 closing the operational fluid circuit 101, and consequently the whole PRD 1, to avoid any overpressure going to the coupled installation.

A second embodiment is represented on FIG. 4, on which it shows a closer look at the SRD 6. In this second embodiment, the SRD 6 is a safety relief valve (SRV) 602. The SRV 602 is reversible, and the system could easily be reset. In case of overpressure, the SRV 602 opens, letting the overpressure fluid go through the relief fluid circuit 102 to the ESOV 4, said ESOV 4 closing the operational fluid circuit 101 to avoid any overpressure going to the coupled installation.

A third embodiment of the invention is represented on FIG. 5, on which a residual pressure valve (RPV) 7 is added. In this example, the RPV 7 is placed upstream of the ESOV 4, but the RPV 7 may as well be placed downstream of the ESOV 4. The RPV 7 allows to keep a small amount of pressure stored to help the ESOV 4 engage more quickly. A gas filter 13 is also placed on the system, the gas filter 13 filtering out any unwanted particles.

A fourth embodiment of the invention is represented on FIG. 6, on which a non-return valve (NRV) 8 is placed downstream of the ESOV 4. The NRV 8 allows the fluid to flow in only one direction and may be fitted to ensure that the fluid flows through the circuits in the right direction, where pressure conditions may otherwise cause reversed flow.

On FIG. 6, the RPV 7 and the NRV 8 are placed upstream and downstream of the ESOV 4 respectively. However, the position of the RPV 7 and the NRV 8 might vary, i.e. their places might be interchanged, both the RPV 7 and the NRV 8 might be placed upstream of the ESOV 4 or downstream of the ESOV 4.

The PRD 1 may have a NRV 8, and its position may vary. In addition, the number of non-return valves found in the PRD 1 may be more than one.

A fifth embodiment of the invention is represented on FIG. 7, on which a closer look is taken on the emergency shutoff valve. In this case, the RPV 7 is used as the emergency shutoff valve. The RPV 7 will therefore have two roles, and will be used to close the system when the SRD 6 is open. A NRV 8 may also be placed downstream of the RPV 7.

The RPV 7 can be used as an emergency shutoff valve, by connecting the SRD back to the RPV 7 through the relief fluid circuit 102. As stated earlier, the NRV 8 shown on FIG. 7 is optional, may be placed somewhere else on the PRD 1 and may not be the only NRV on the system.

A sixth embodiment of the invention is represented on FIG. 8, on which the RPV 7 acts as the ESOV 4, and where the RPV 7 comprises a NRV 8. This NRV feature might be added as a separate and complementary function.

A seventh embodiment of the invention is represented on FIG. 9, on which we can see a close look at the relief fluid circuit 102. In this seventh embodiment, the SRD is the SRV 602, and the ESOV 4 is the RPV 7.

A reset valve 9 is placed downstream of the SRV 602. The reset valve 9 is used to collect the overpressure at the back of the ESOV when the SRV 602, or more generally the SRD, is open. The reset valve is used to easily reopen the system by purging the zone downstream of the SRD and to the back of the ESOV (upstream).

The emergency shutoff valve 4 and/or the residual pressure valve 7 may use gaskets and/or seals such as O-ring seals, said gaskets and/or seals being prone to leak. These leaks would be minimal but might need consideration. Therefore, the PRD 1 may comprise a bleeding valve 10, as shown on FIG. 9. The bleeding valve 10 allows minor amounts of fluid to be released from the system in case of, for example, leakage from elastomeric rings, to avoid any pressure build-up on the ESOV 4 or the RPV 7 that could hinder the system's core function, especially when the SRD 6 is not open. In addition, the bleeding valve 10 may also comprise a flap 1001, that would be pushed against the bleeding valve 10 in order to close it when the SRD 6 is open. This flap 1001 would deny the fluid to be released from the bleeding valve in case of pressure surge arising from the SRD 6. The flap 1001 may for example be made of polyurethane.

FIG. 9 presents the SRV 602 as the SRD, but neither the reset valve nor the bleeding valve is limited to be used with a SRV only. The SRV 602 is there for the illustration purposes only and the invention is not limited to this type of SRD.

FIG. 10 presents an eighth embodiment, focusing the view on the RPV 7. The residual pressure valve 7 comprises a middle chamber 701 in its central part, a front chamber 704, a back chamber 705 being respectively closer to the outlet interface 5 and to the bleeding valve 10, and also comprises a first piston 702. An entry connection 1102 connects the PRU 3 and the RPV 7, a first connection 1103 connects the RPV 7 (downstream) and the SRD 6 (upstream), and a second connection 1104 connects the SRD 6 (downstream) and the middle chamber 701 (upstream). If the pressure in the front chamber 704 of the RPV 7 and in the first connection 1103 is smaller than the pressure $P_L$, the fluid would not flow through the second connection 1104 as the SRD 6 is not open. In the contrary, if an overpressure is detected and the SRD 6 is open, the first piston 702 would prevent the fluid flow from going out of the outlet interface 5 as the released pressure would push the first piston 702 toward the outlet interface 5 until it is fully closed.

The RPV 7 may also comprise a second piston 703, and the middle chamber 701 would be delimited by the first piston 702 and the second piston 703 on each side, and that in the open position of the safety relief device 6, the bleeding valve 10 is closed by the hinged flap 1001 as it is being pushed by the second piston 703 and is extending itself on the bleeding valve 10.

When the safety relief device 6 is open, the first piston 702 is pushed by the first springs 7021 as well as the pressure released to the middle chamber, said first piston 702 being pushed towards the outlet interface 5 in order to close the operational fluid circuit 101. Similarly, when the SRD is open, the second piston 703 is pulled away by the overpressure fluid released by the SRD to allow the flap 1001 to close the bleeding valve 10. A second springs 7031 could be used to reopen the bleeding valve 10.

While the invention has been described in conjunction with specific embodiments thereof, it is important to note that combinations of embodiments is feasible and may be considered.

The invention claimed is:

1. A pressure reducing device comprising an upstream end configured to be connected to a pressurized gas source and a downstream end configured to be connected to a coupled installation and comprising:

an operational fluid circuit comprising a pressure reducing unit configured to reduce a pressure of a pressurized gas flow to a maximum pressure $P_A$, an emergency shut-off valve and an outlet interface with a pressure capability $P_N$, a relief fluid circuit comprising a first end connected to the operational fluid circuit downstream of the pressure reducing unit and a safety relief device, the relief fluid circuit comprising a second end connected to the emergency shutoff valve, and that the safety relief device is configured to have at least two states, a closed state where the safety relief device is inactive and the emergency shutoff valve is open, when the pressure in the fluid circuit downstream of the pressure reducing unit is lower than a predetermined pressure $P_L$, and an open state where the safety relief device is active and the emergency shutoff valve is closed, when the pressure in the fluid circuit downstream of the pressure reducing unit is higher than the predetermined pressure $P_L$, the predetermined pressure $P_L$ being between $P_A$+5% and $P_A$+500% and/or between $P_N$+5% and $P_N$+500% wherein the operational fluid circuit comprises a residual pressure valve and/or a non-return valve, further comprising a bleeding valve, wherein a central part of the residual pressure valve comprises a second piston, and in that a middle chamber is delimited by a first piston and the second piston, and that in the open position of the safety relief device, the bleeding valve is moved in a closed position by the second piston.

2. The pressure reducing device according to claim 1, wherein the operational fluid circuit comprises a main shutoff valve.

3. The pressure reducing device according to claim 1, wherein the emergency shutoff valve is placed downstream of the pressure reducing unit.

4. The pressure reducing device according to claim 1, further comprising the residual pressure valve, wherein the residual pressure valve is the emergency shutoff valve.

5. The pressure reducing device according to claim 4, wherein the non-return valve is comprised in the emergency shutoff valve.

6. The pressure reducing device according to claim 1, wherein the safety relief device comprises a bursting disc.

7. The pressure reducing device according to claim 1, wherein the safety relief device comprises a safety relief valve.

8. The pressure reducing device according to claim 1, wherein the safety relief device and the emergency shutoff valve are connected through a fluid connection, said fluid connection comprising a reset valve.

9. The pressure reducing device according to claim 1, wherein the pressure reducing device is a one-way valve.

10. The pressure reducing device according to claim 1, wherein the relief fluid circuit comprises the bleeding valve.

11. The pressure reducing device according to claim 1, wherein the relief fluid circuit comprises a flap leaning against the bleeding valve.

12. The pressure reducing device according to claim 1, wherein the central part of the residual pressure valve comprises the first piston being mobile in the middle chamber, and in that the residual pressure valve has three connections:

an entry connection fluidly connecting a pressure reducing unit outlet to the residual pressure valve, a first connection fluidly connecting a residual pressure valve outlet to the safety relief device and a second connection fluidly connecting a safety relief device outlet to the middle chamber of the residual pressure valve, and that in an open position of the safety relief device, the outlet interface is moved in a closed state by the first piston.

13. A device for storing and supplying compressed gas comprising a fluid source and a pressure reducing device according to claim 1.

* * * * *